(12) United States Patent
Valenti, Jr. et al.

(10) Patent No.: US 8,182,893 B2
(45) Date of Patent: May 22, 2012

(54) SHEET COMPRISING A PLURALITY OF HOSPITAL WRISTBANDS CONNECTED TO A BACKING SHEET WITHOUT PERFORATIONS BETWEEN THE BANDS

(75) Inventors: F. Paul Valenti, Jr., Barrington, IL (US); Carl Opel, Carol Stream, IL (US); Dan Hedger, Grayslake, IL (US)

(73) Assignee: Chicago, Tag & Label, Inc., Libertyville, IL (US)

( * ) Notice: Subject to any disclaimer, the term of this patent is extended or adjusted under 35 U.S.C. 154(b) by 0 days.

(21) Appl. No.: 12/853,694

(22) Filed: Aug. 10, 2010

(65) Prior Publication Data

US 2012/0037302 A1  Feb. 16, 2012

(51) Int. Cl.
- *B32B 9/00* (2006.01)
- *B32B 33/00* (2006.01)
- *B42D 15/00* (2006.01)
- *G09F 3/02* (2006.01)
- *G09F 3/04* (2006.01)

(52) U.S. Cl. ............. 428/40.1; 428/41.7; 428/42.1; 428/42.2; 428/42.3; 283/75; 283/107; 283/109; 283/900; 40/625; 40/628; 40/630; 40/633

(58) Field of Classification Search ............ 428/40.1, 428/41.7, 41.8, 42.1–42.3; 283/75, 107, 283/109, 900; 40/625, 628, 630, 633, 638, 40/655

See application file for complete search history.

(56) References Cited

U.S. PATENT DOCUMENTS

| | | |
|---|---|---|
| 4,914,843 A | 4/1990 | DeWoskin |
| 5,364,133 A | 11/1994 | Hofer et al. |
| 5,933,993 A | 8/1999 | Riley |
| 6,000,160 A | 12/1999 | Riley |
| 6,016,618 A | 1/2000 | Attia et al. |
| 6,058,637 A | 5/2000 | Duncan |
| 6,067,739 A | 5/2000 | Riley |
| 6,438,881 B1 | 8/2002 | Riley |
| 6,510,634 B1 | 1/2003 | Riley |
| 6,546,656 B2 | 4/2003 | Twentier |
| 6,748,687 B2 | 6/2004 | Riley |
| 6,836,215 B1 | 12/2004 | Laurash et al. |
| 7,240,446 B2 | 7/2007 | Bekker |
| 7,454,855 B2 | 11/2008 | Kotik et al. |
| 7,520,079 B2 | 4/2009 | Stallings et al. |
| 2004/0237366 A1 | 12/2004 | Chadwick et al. |
| 2006/0236578 A1 | 10/2006 | Saint et al. |
| 2006/0254105 A1 | 11/2006 | Chang |
| 2008/0098636 A1* | 5/2008 | Greer ............... 40/633 |
| 2008/0276504 A1 | 11/2008 | Cloninger |
| 2008/0301990 A1 | 12/2008 | McDermott |
| 2011/0107637 A1* | 5/2011 | Bekker .............. 40/633 |
| 2011/0131854 A1* | 6/2011 | Waltersdorf ........... 40/633 |

\* cited by examiner

*Primary Examiner* — Patricia Nordmeyer

(74) *Attorney, Agent, or Firm* — Miller, Matthias & Hull LLP

(57) ABSTRACT

A group of size-adjustable wristbands is disclosed. The group of wristbands includes a backing sheet that is connected to a stub area disposed at an end of the backing sheet. A plurality of elongated strips is connected to the stub area in a side-by-side fashion. Each strip includes a first end attached to an additional stub area and a second end attached to the stub area. Each strip further includes a top surface. The group of wristbands further includes a plurality of top sheets, each top sheet having a first end and a second end. The first end of each top sheet is attached to one of the strips along a top surface thereof. Each top sheet is clear and includes a bottom side coated with a top adhesive layer. Finally, the group of wristbands includes a plurality of top liners with each top liner being sandwiched between one of the top adhesive layers and one of the strips.

29 Claims, 7 Drawing Sheets

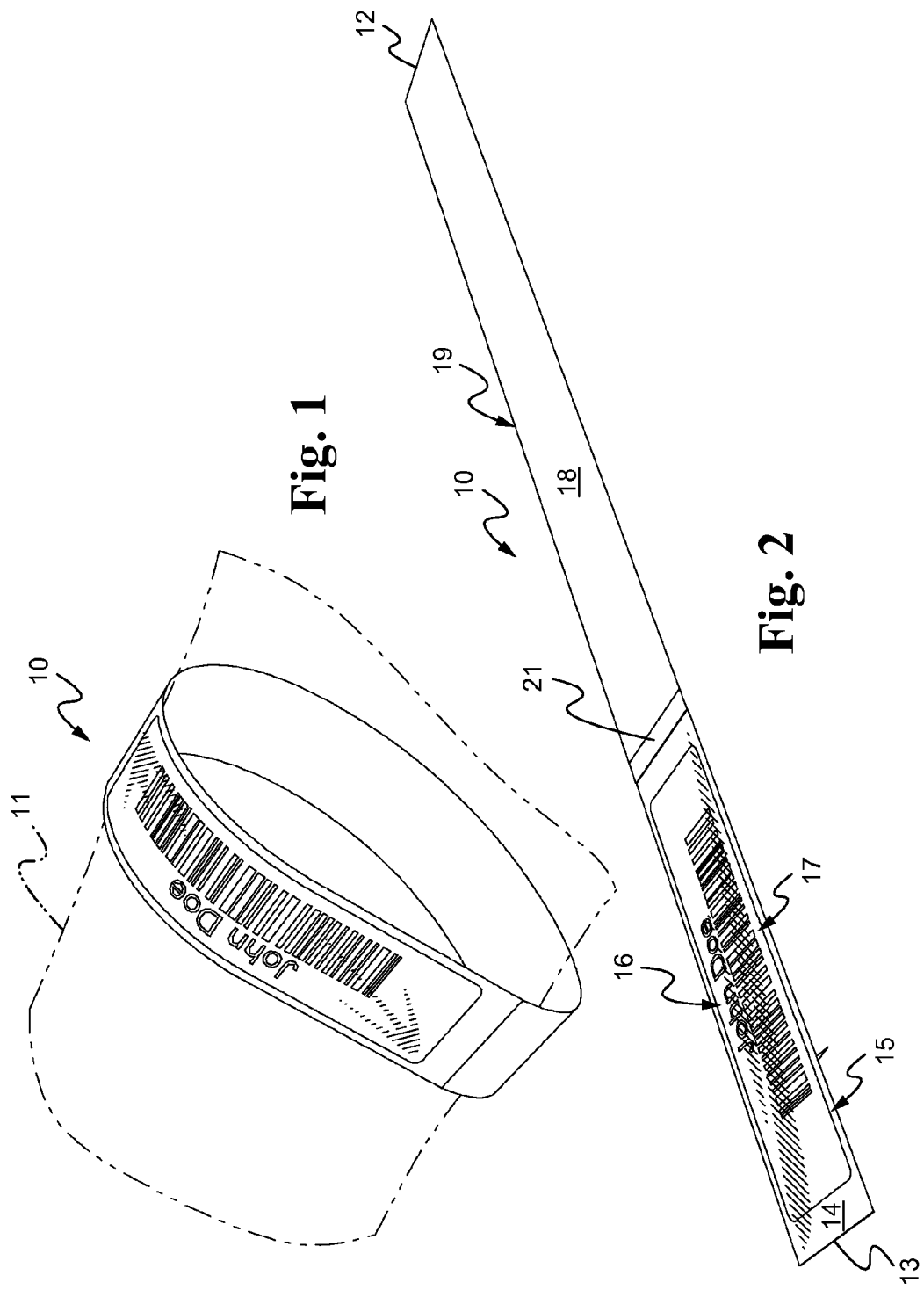

SHEET COMPRISING A PLURALITY OF HOSPITAL WRISTBANDS CONNECTED TO A BACKING SHEET WITHOUT PERFORATIONS BETWEEN THE BANDS

BACKGROUND

1. Technical Field

This disclosure relates generally to identification wristbands and, more particularly, to temporary identification wristbands used in a hospital or medical setting.

2. Description of the Related Art

Identification wristbands are used in many situations where a person requires short-term identification. For example, such identification wristbands may be used at meetings, hotels and resorts, concerts, transportation scenarios and, more typically, patients in hospitals or other institutions. In a hospital or medical setting, proper identification is particularly important as it prevents patients from receiving the wrong medication or wrong medical procedure. Identifying wristbands also allow hospitals to track the usage of hospital facilities by a patient for billing purposes.

Hospital and medical environments place substantial demands on patient identification wristbands. Specifically, the wristbands need to be produced where they are used, specifically at nursing stations or at admission stations. The wristbands also may need to include a photograph of the patient or, more particularly, barcodes both of which require high resolution to be useful. The wristbands also must be resistant to water and other common solvents. The wristbands also must be comfortable, sanitary and strong enough to withstand deliberate attempts by a patient to remove the wristband. Such wristbands must also be easy for medical personnel to make and apply.

Some currently available hospital identification wristbands include a paper strip encapsulated in a transparent film to render the strip tear resistant and water resistant. However, the use of film sleeves or adhesive backed films are often difficult for hospital personnel to use. Further, the plastic sleeve or film layer may include gaps or bubbles if not properly assembled thereby enabling the paper strip to be destroyed when the wristband is immersed in water. If barcodes are utilized, the paper strip must be printed using the laser printer as wicking of water-based inks of inkjet printers may render the barcodes unreadable.

Other hospital identification wristbands are multiple-part and include a top "window" layer that is attachable to the primary band or strip. A label providing patient indicia can be placed under the top window layer. However, the current designs are cumbersome to use. When provided as long, thin, single strips, wristbands are difficult to store because a stack of them will easily fall over. A stack of 50 wristbands is also tall and difficult to contain in a typical work station. Further, when a long thin wristband is furnished as a single strip, it is difficult to grasp, manipulate, and use due to its awkward size.

There are also times where multiple wristbands need to be associated with each other. An example is in the maternity area, where a father, mother, and baby or multiple babies will all need a wristband. Currently, there is no convenient method for printing groups of wristbands at a work station. Accordingly, improved identification wristbands are needed that overcome the difficulties associated with the prior art identification wristbands described above.

SUMMARY OF THE DISCLOSURE

In satisfaction of the aforenoted needs, groups of size-adjustable wristbands are disclosed. The group of size-adjustable wristbands comprises a backing sheet attached to stub area. The group also comprises a plurality of bottom liners that may optionally be connected to the stub area in a side-by-side fashion. The group also comprises a plurality of strips connected to the stub area in a side-by-side fashion and each in matching registry with one of the bottom liners. Each strip comprises a first end and a second end, with the second end attached to the stub area. Each strip also comprises a bottom side partially coated with a bottom adhesive layer disposed in matching registry with one of the bottom liners. Each strip further comprises a top surface. The group also comprises a plurality of top sheets that each has a first end and a second end. The first end of each top sheet is attached to one of the strips along a top surface thereof. The second end may be optionally attached to the stub area and in matching registry with one of the strips. Each top sheet is clear or see-through and includes a bottom side coated with a top adhesive layer. Finally, each group also comprises a plurality of top liners. Each top liner is sandwiched between one of the top adhesive layers and one of the strips.

In a refinement, the second ends of the strips and the stub area are perforated to permit separation of the strips from the stub area without tearing the strips.

In a refinement, one or more of the bottom liners, top liners and second ends of the top sheets may be connected to the stub area.

In another refinement, any one or more of the stub area, bottom liners, second ends of the strips, top liners and top sheets may be perforated to permit separation of the bottom liners, second ends of the strips, top liners and top sheets from the stub area without tearing the bottom liners, second ends of the strips, top liners and top sheets.

In another refinement, the first ends of the strip may be connected to an additional stub and the additional stub area and first ends of the strips may be perforated to permit separation of the first ends of the strips from the additional stub area without tearing.

In another refinement, the second ends of the strips may overlie and extend beyond the bottom liner in the stub area to permit the backing sheet to be attached to the second ends of the strips in the stub area.

In another refinement, the second ends of the top sheets and the second ends of the strips may overlie and extend beyond the top liners in the stub area to permit the second ends of the top liners and the second ends of the strips to be attached in the stub area.

In another refinement, the backing sheet may be fabricated from paper.

In another refinement, the top and bottom liners may be fabricated from silicone-coated paper.

In another refinement, the strips may be fabricated from a synthetic film.

In another refinement, the top and bottom adhesive layers may be a pressure sensitive adhesive.

In another refinement, the top sheet may be a clear synthetic film.

In another refinement, the strips may be attached to the stub area with a hot melt adhesive or a cold adhesive.

A method for applying patient indicia to a size-adjustable hospital wristband is also disclosed which comprises providing a group of size-adjustable hospital wristbands as described above; removing the bottom liner, top liner, top sheet and second end of said strip from the stub area; placing the label with patient indicia on the top surface of said strip in matching registry with the top sheet attached to said strip; removing the top liner; and applying the top sheet and top adhesive layer over the label.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 1 schematically illustrates a disclosed wristband worn on a wrist of a patient;

FIG. 2 is a perspective view of a disclosed wristband;

Figure 3:
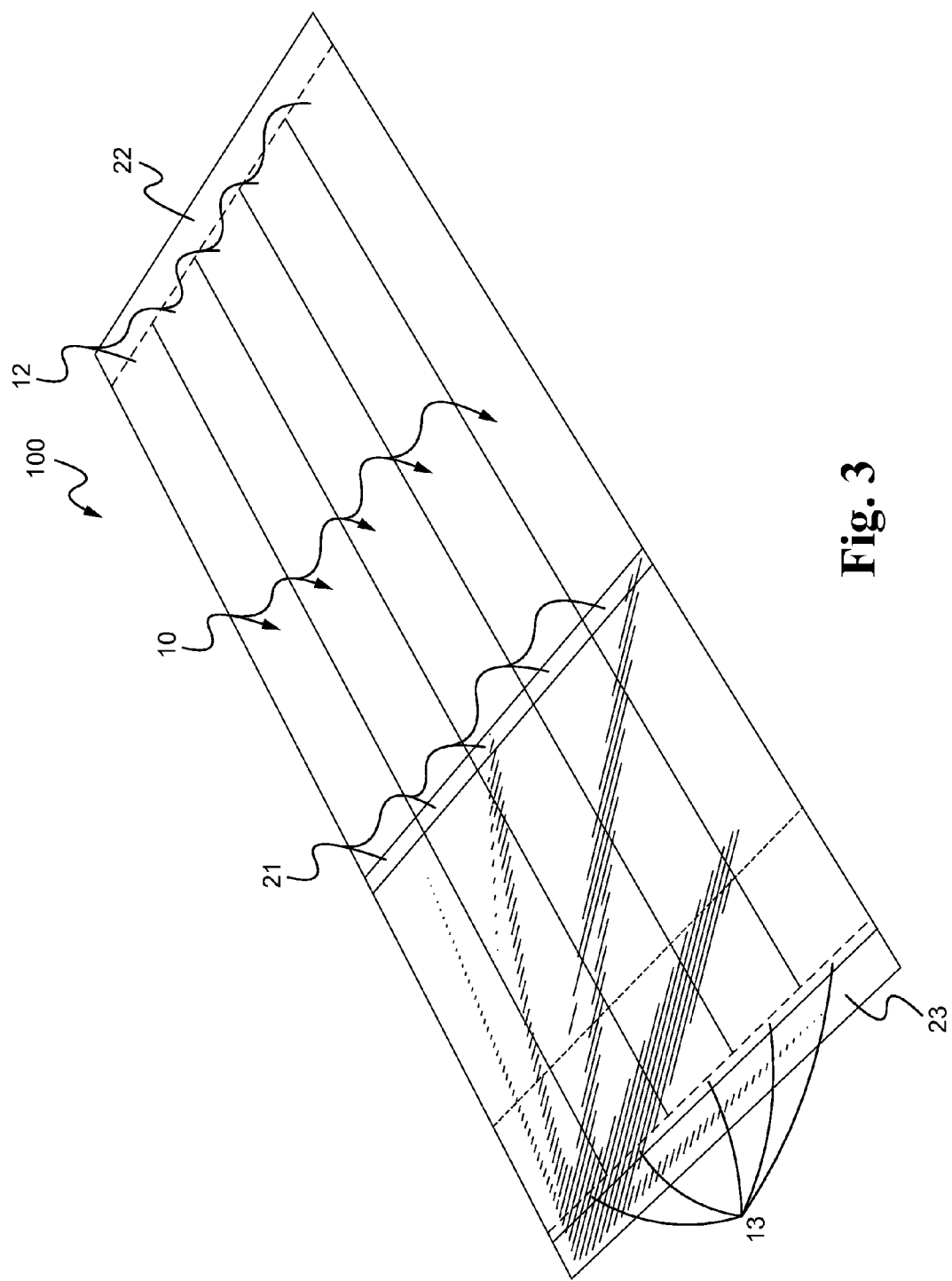
FIG. 3 is a perspective view of a group of disclosed wristbands attached to a common backing sheet.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Turning to FIG. 1, a wristband 10 is illustrated as attached to a wrist 11. In FIG. 2, the wristband 10 includes a first end 12 and a second end 13. A top sheet 14 is disposed on top of a label 15. Preferably, the top sheet 14 is clear so that the label 15, with patient indicia such as a name 16, barcode 17, etc., can be viewed through the top sheet 14. The top sheet 14 is attached to an upper surface 18 of the strip 19 of the wristband 10 at 21, which may be a weld line, a glue line or adhesive on the underside of the top sheet 14 may be used to secure the top sheet 14 to the strip 19.

Figure 4:
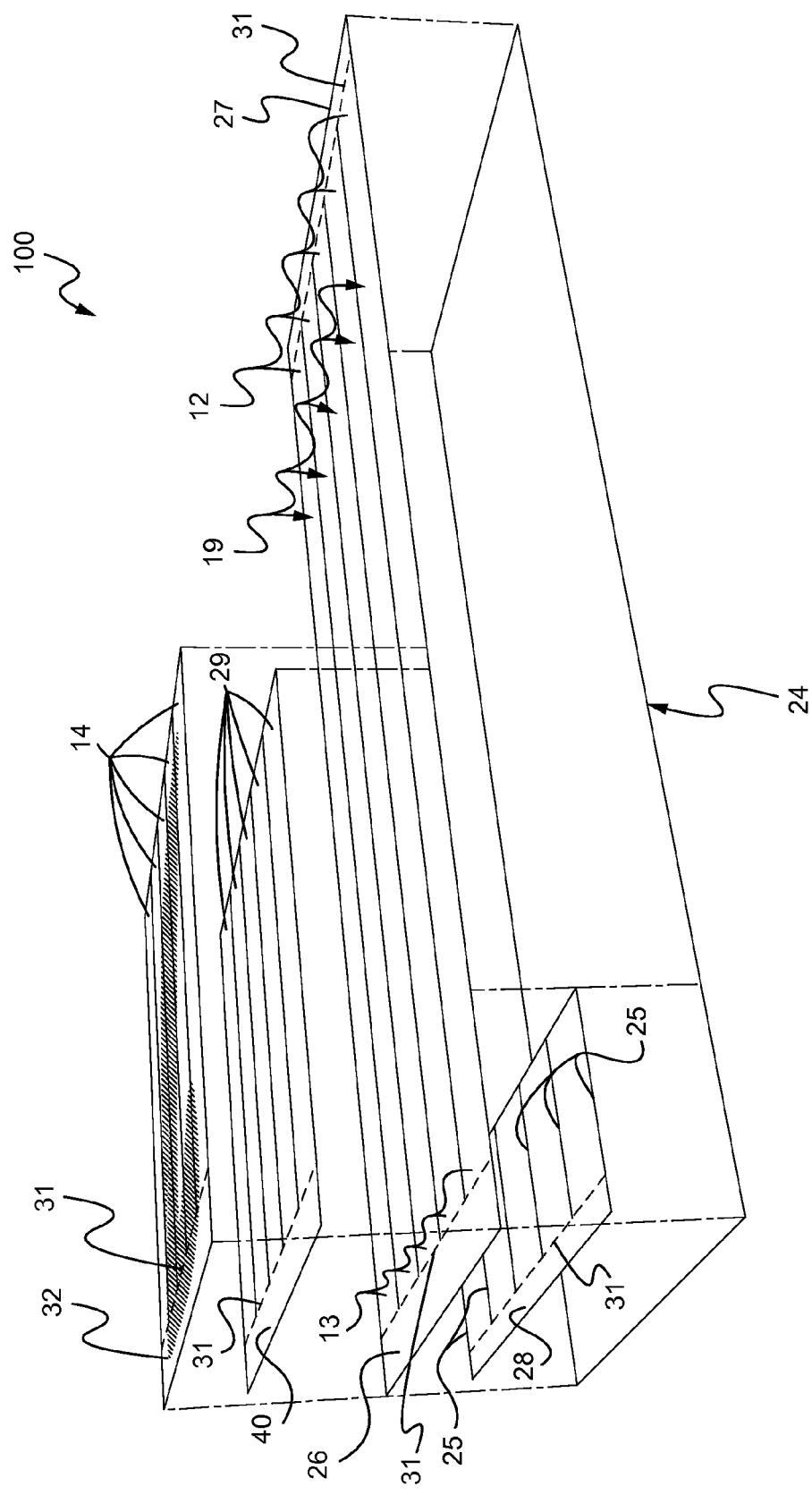
FIG. 4 is an exploded view of the group of wristbands illustrated in FIG. 3, particularly illustrating the bottom backing sheet, bottom liners, strips, top liners and top sheets.

Turning to FIG. 3, the wristbands 10 may be provided in a group 100 with the first ends 12 of each wristband 10 being attached to an additional stub area 22. Similarly, as discussed in detail below, the second end 13 of each wristband 10 is attached to a stub area 23. As best seen in FIG. 4, each group 100 of wristbands 10 are joined at stub areas 28, 26, 40, 32, which are connected to backing sheet 24. Beneath each wristband 10 is a bottom liner 25. The bottom liners 25 are attached to the underside of the strips 19 by a layer of adhesive (not shown).

As seen in FIG. 4, the strips 19 may extend beyond the bottom liners 25 so that the stub area 26 of the strips 19 may be directly attached to the backing sheet 24 with glue or adhesive. The first ends 12 of the strips 19 are also detachably connected to the stub area 27, which, in turn, is attached to the lower backing sheet 24. To provide an overlap of the stub area 26 beyond the stub area 28 of the bottom liners 25, the stub area 26 may be longer than the stub area 28 so that a portion of the bottom side of the stub area 26 may be directly attached to the backing sheet 24, preferably using an adhesive, such as a hot melt adhesive or a cold melt adhesive. Hot melt adhesives are preferred.

A plurality of top 29 are is disposed between a plurality of top sheets 14 and the plurality of strips 19. The top liners 29 may be joined at a stub area 40 and the top sheets 14 may be joined at a stub area 32. Similar to the stub area 28, the stub area 40 may be shorter than the stub area 26 thereby enabling the stub area 32 of the top sheets 14 to be attached to the stub area 26 of the strips 19.

Each of the stub areas 28, 26, 40, 32 and 27 may be scored or include a perforation line 31. One perforation line 31 enables the first ends 12 of the strips 19 to be easily removed from the stub area 27. Another perforation line 31 enables the bottom liners 25 to be removed from the stub area 28. Yet another perforation line 31 enables the second ends 13 of the strips 19 to be easily removed from the stub area 26. The other perforation lines 31 enable the top liners 29 and top sheet 14 to be easily removed from the stub areas 40, 32 respectively.

Figure 5:
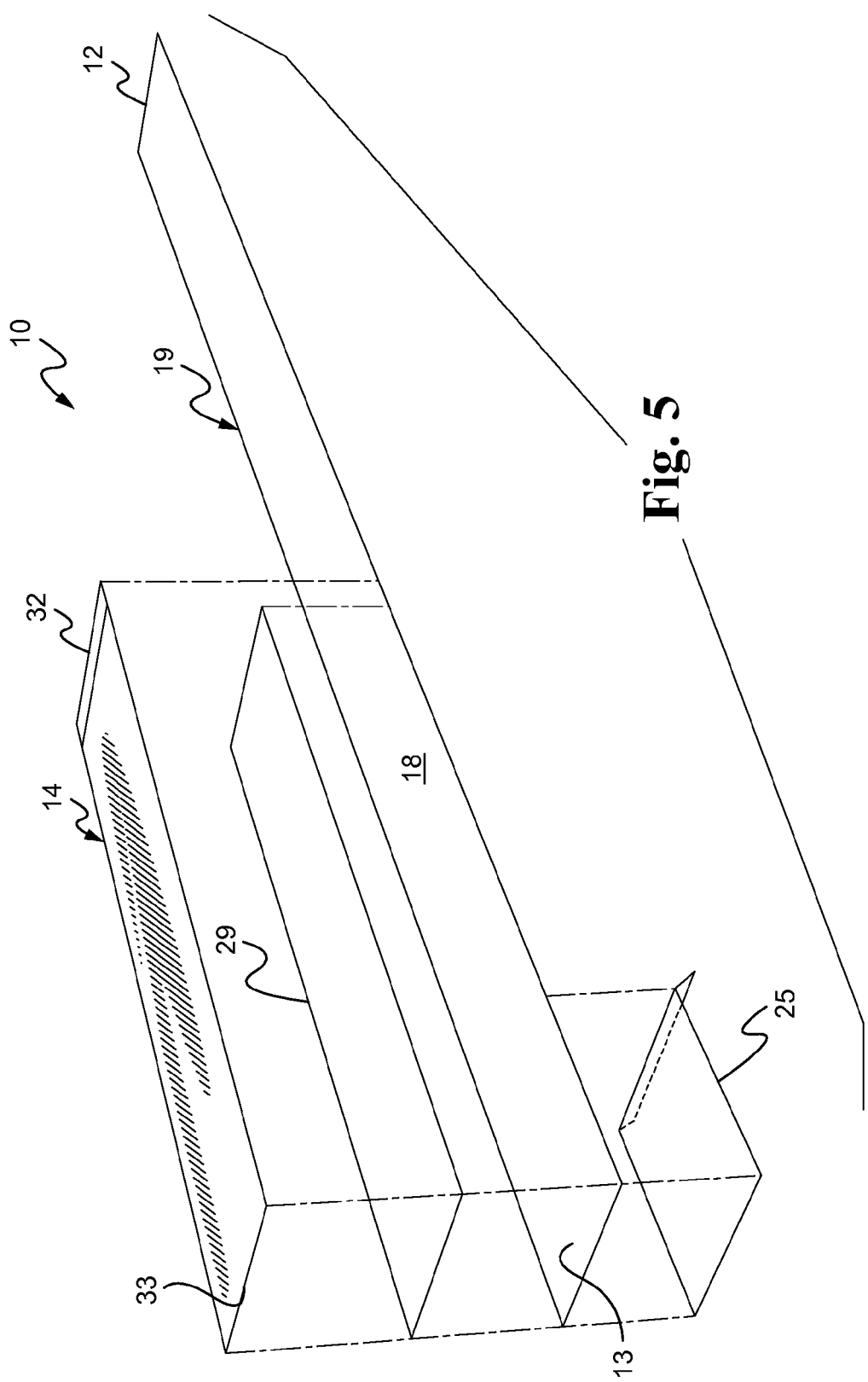
FIG. 5 is an exploded view of one of the wristbands illustrated in FIGS. 3 and 4.
Figure 8:
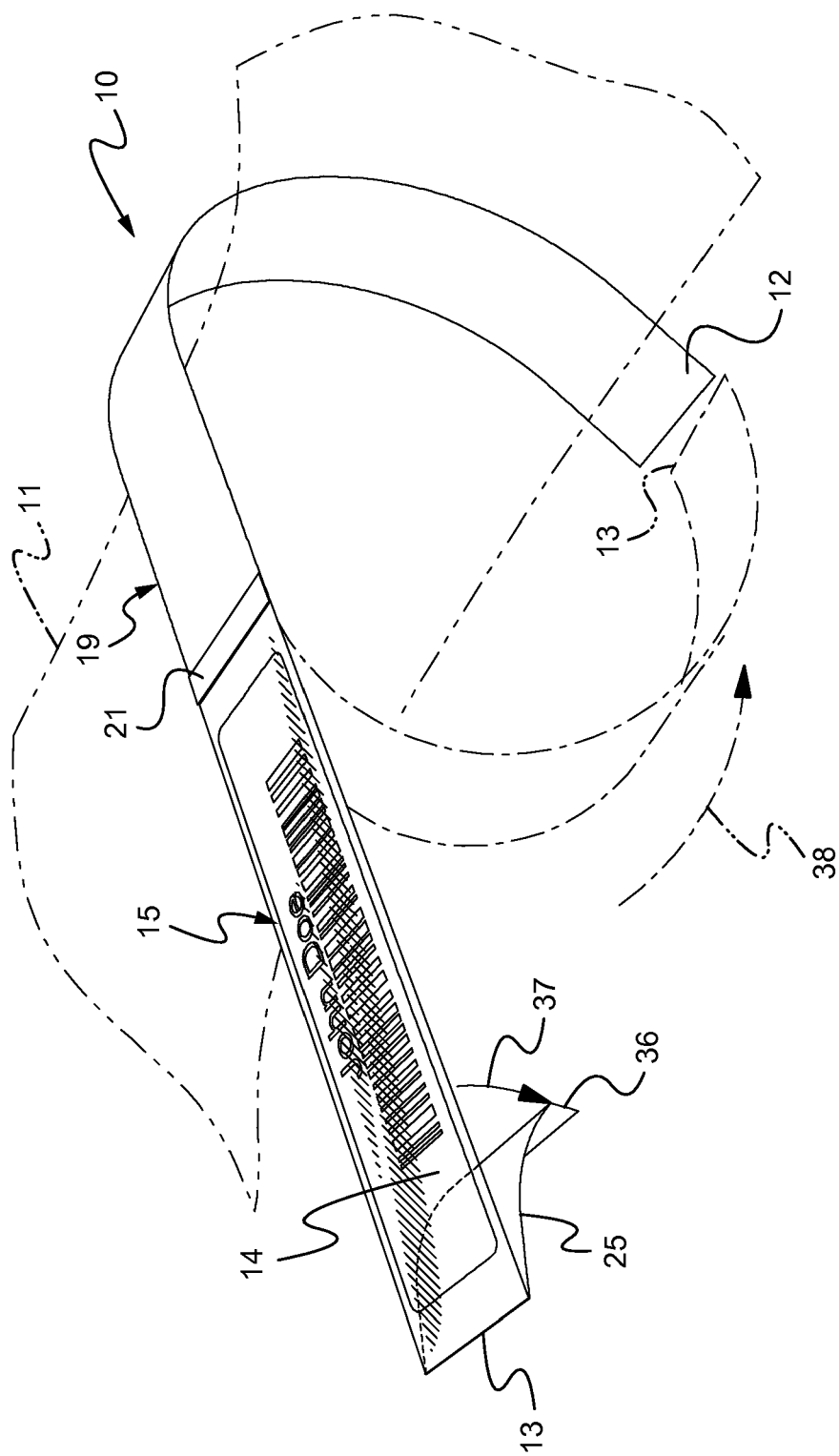
FIG. 8 illustrates the application of the wristband illustrated in FIGS. 6-7 to a patient's wrist.

An exploded view of a wristband 10 is provided in FIG. 5. A bottom liner 25 may be secured to an underside of the strip 19 with a layer of adhesive, preferably pressure sensitive adhesive or contact adhesive at the second end 13 of the strip 19. The layer of adhesive (not shown) disposed at the underside of the strip 19 near the second end 13 of the strip 19 enables the first end 12 of the strip to be secured to the second end 13 of the strip 19 as seen in FIGS. 1 and 8. The upper surface 18 of the strip 19 is partially covered by the top sheet 14. The top sheet 14 includes a first end 32 and a second end 33. The first end 32 may be glued or welded to the top surface 18 of the strip 19. The underside of the top sheet 14 is coated with a layer of adhesive and the top liner 29 is attached to the underside of the top sheet 14 using this layer of adhesive (not shown).

Figure 6:
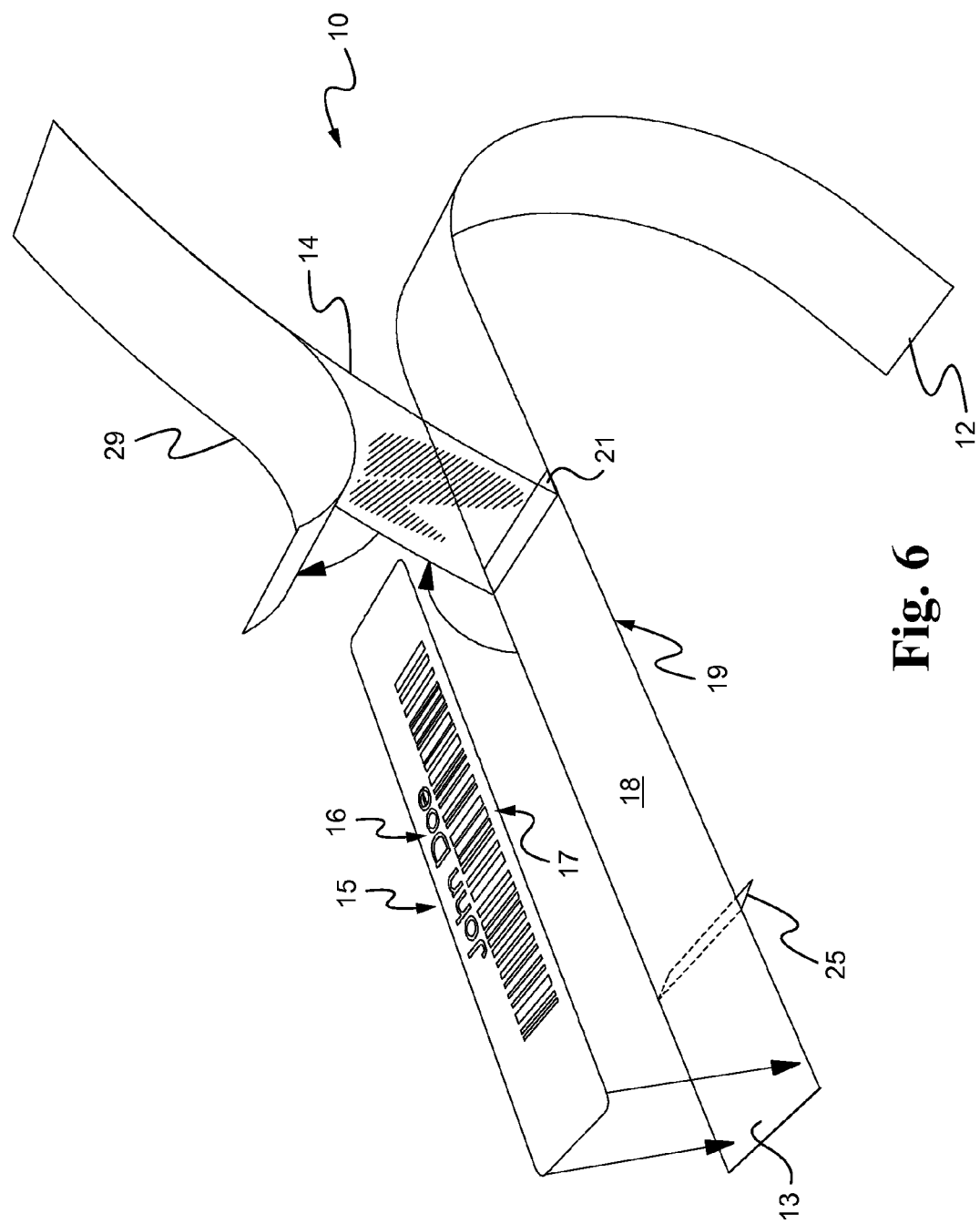
FIGS. 6 and 7 illustrate the application of a patient indicia label to the wristbands illustrated in FIGS. 1-5.
Figure 7:
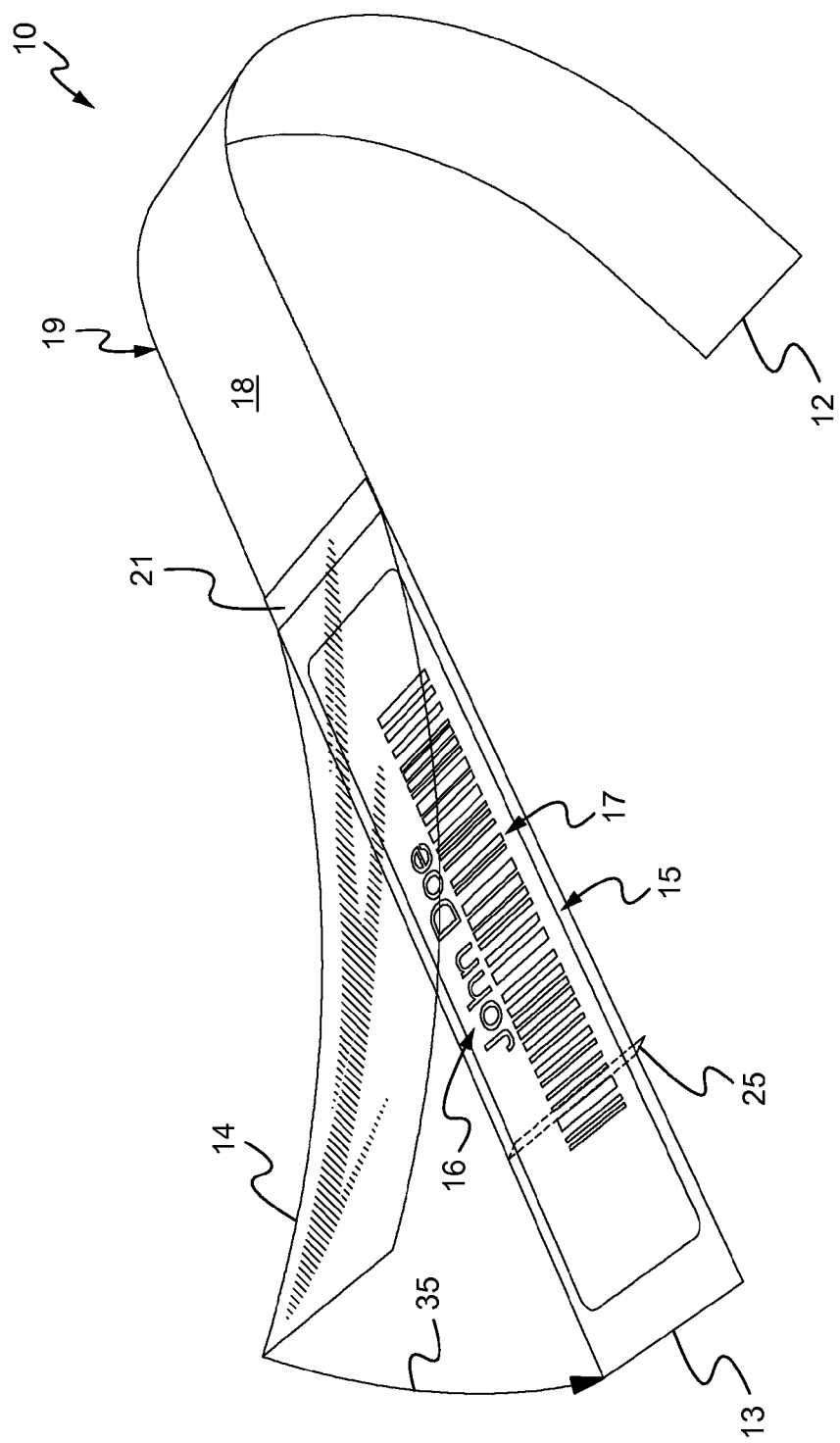

Turning to FIGS. 6 and 7, to install a label 15 that provides useful indicia such as a patient's name 16 and/or a barcode 17, the top sheet 14 and liner 29 are lifted off the strip 19 as illustrated in FIG. 6. With the portion of the strip 19 between the glue line 21 and second end 13 exposed, a label 15 can be applied to the upper surface 18 of the strip 19. Turning to FIG. 7, with the label 15 in place, the top liner 29 is removed and the top sheet 14 is folded downward in the direction of the arrow 35 to cover the label 15 and provide a waterproof bather thereby protecting the name 16 and barcode 17 information. In addition to the name 16 and barcode 17, additional indicia may be placed on the label 15 such as a photograph, allergies, medications, etc., as will be apparent to those skilled in the art.

Turning to FIG. 8, a procedure for installing the wristband 10 on a patient's wrist 11 is illustrated. First, the bottom liner 25 is removed by pulling the tab 36 in the direction of the arrow 37. The second end 13 of the strip 19 may then be attached to the first end 12 of the strip 19 by moving the second end 13 of the strip 19 in the direction of the arrow 38.

The group 100 of wristbands 10 attached to the backing sheet 24 are easy to stack and therefore store in significant quantities at a work station. In contrast, when prior art wristbands are provided as long, thin, single strips, they are difficult to store because a stack of wristbands will easily fall over. A stack of 50 of prior art wristbands, for example, will be tall and difficult to contain in a typical work station. When provided as a plurality or group 100 of bands 10 on a larger backing sheet 24, a large quantity of wristbands 10 are easily stacked in a short stack, and easily kept on top of a desk or in a drawer.

Further, the bands 10 as provided herein are easy to grasp and manipulate. In contrast, when a long thin prior art wristband is furnished as a single strip, it is difficult to grasp, manipulate, and use due to its awkward size. When the disclosed group 100 of bands 10 are provided on the large sheet 24 as disclosed herein, the sheet 24 serves to help hold the narrow strips 19 in place while applying the label 15 with indicia 16, 17, removing the top liner 29, and applying the adhesive backed clear top sheet 14 over the label 15.

Finally, there are times where multiple wristbands need to be associated with each other, and are best controlled if attached to the single backing sheet 24 as disclosed herein. An example is in the maternity area, where a father, mother, and baby or multiple babies will all need a wristband 10. Furnishing multiple wristbands 10 on a single sheet 24 will avoid mismatching, misplacing, and loss of associated wristbands 10.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A group of size-adjustable wristbands, comprising:
 a backing sheet connected to a bottom surface of a stub area;
 a plurality of bottom liners disposed between the backing sheet and a plurality of strips, each bottom liner being removably adhered to one of the plurality of strips; and
 each strip of the plurality of strips comprising a first end and a second end, the second end detachably attached to the stub area so that at least a portion of each strip is in matching registry with one of the bottom liners, each strip also comprising a bottom side partially coated with a bottom adhesive layer disposed in matching registry with one of the bottom liners.

2. The group of size-adjustable wristbands of claim 1 wherein the second ends of the strips and the stub area are perforated to permit separation of the strips from the stub area without tearing the strips.

3. The group of size-adjustable wristbands of claim 1 wherein the bottom liners are detachably attached to the stub area in matching registry with one of the strips.

4. The group of size-adjustable wristbands of claim 1 wherein the stub area is detachably connected to the bottom liners and second ends of the strips, and the stub area, bottom liners and second ends of the strips are perforated to permit separation of the bottom liners and second ends of the strips from the stub area without tearing the bottom liners and second ends of the strips.

5. The group of size-adjustable wristbands of claim 1 further comprising an additional stub area detachably attached to the first ends of the strips, the additional stub area and first ends of the strips being perforated.

6. The group of size-adjustable wristbands of claim 1 wherein the stub area and the backing sheet extend beyond the bottom liners to permit the backing sheet to be attached to the stub area.

7. The group of size-adjustable wristbands of claim 1 wherein the backing sheet is fabricated from paper and the strips comprise a synthetic film.

8. The group of size-adjustable wristbands of claim 1 wherein the bottom adhesive layer comprises pressure sensitive adhesive.

9. The group of size-adjustable wristbands of claim 1 wherein the plurality of strips are attached to the backing sheet in stub area with adhesive.

10. A group of size-adjustable hospital wristbands, comprising:
 a backing sheet connected to a bottom surface of a stub area;
 a plurality of bottom liners disposed between the backing sheet and a plurality of strips, each bottom liner being removably adhered to one of the plurality of strips;
 each strip of the plurality of strips comprising a first end and a second end, the second end attached to the stub area, each strip also comprising a bottom side partially coated with a bottom adhesive layer disposed in matching registry with one of the bottom liners, each strip further comprising a top surface; and
 wherein the stub area and second ends of the strips are perforated to permit separation of the strips from the stub area without tearing.

11. The group of size-adjustable wristbands of claim 10 wherein the second ends of the strips overlie and extend beyond the bottom liners in the stub area to permit the backing sheet to be attached to the stub area and the second ends of the strips to be detachably attached to the stub area.

12. A group of size-adjustable wristbands, comprising:
 a backing sheet connected to a bottom surface of a stub area;
 a plurality of bottom liners disposed between the backing sheet and a plurality of strips, each bottom liner being removably adhered to one of the plurality of strips;
 each strip of the plurality of strips comprising a first end and a second end, the second end detachably attached to the stub area so that at least a portion of each strip is in matching registry with one of the bottom liners, each strip also comprising a bottom side partially coated with a bottom adhesive layer disposed in matching registry with one of the bottom liners, each strip further comprising a top surface;
 a plurality of top sheets, wherein each top sheet having a first end and a second end, the first end of each top sheet is attached to a top surface of one of the strips and in matching registry with said one of the strips, each top sheet being clear and including a bottom side coated with a top adhesive layer; and
 a plurality of top liners, each top liner sandwiched between one of the top adhesive layers and one of the strips.

13. The group of size-adjustable wristbands of claim 12 wherein the second ends of the strips and the stub area are perforated to permit separation of the strips from the stub area without tearing the strips.

14. The group of size-adjustable wristbands of claim 12 wherein each second end of each top sheet is detachably attached to the stub area in matching registry with one of the strips.

15. The group of size-adjustable wristbands of claim 12 wherein the bottom liners are detachably attached to the stub area in matching registry with one of the strips.

16. The group of size-adjustable wristbands of claim 12 wherein the top liners are detachably attached to the stub area in matching registry with one of the top sheets.

17. The group of size-adjustable wristbands of claim 12 wherein the stub area is detachably connected to the bottom liners, second ends of the strips, top liners and second ends of the top sheets, and the stub area, bottom liners, second ends of the strips, top liners and second ends of the top sheets are perforated to permit separation of the bottom liners, second ends of the strips, top liners and second ends of the top sheets from the stub area without tearing the bottom liners, second ends of the strips, top liners and second ends of the top sheets.

18. The group of size-adjustable wristbands of claim 12 further comprising an additional stub area detachably attached to the first ends of the strips, the additional stub area and first ends of the strips being perforated.

19. The group of size-adjustable wristbands of claim 12 wherein the stub area and the backing sheet extend beyond the bottom liners to permit the backing sheet to be attached to the stub area.

20. The group of size-adjustable wristbands of claim 19 wherein the second ends of the top sheets and the second ends of the strips overlie and extend beyond the top liners to permit the second ends of the top sheets and second ends of the strips to be detachably attached to the stub area.

21. The group of size-adjustable wristbands of claim 12 wherein the second ends of the top sheets and the second ends of the strips extend beyond the top liners to permit the second ends of the top sheets and the second ends of the strips to be detachably attached to the stub area.

22. The group of size-adjustable wristbands of claim 12 wherein the backing sheet is fabricated from paper.

23. The group of size-adjustable wristbands of claim 12 wherein the strips comprise a synthetic film.

24. The group of size-adjustable wristbands of claim 12 wherein the top and bottom adhesive layers comprise pressure sensitive adhesive.

25. The group of size-adjustable wristbands of claim 12 wherein top sheets comprise a clear synthetic film.

26. The group of size-adjustable wristbands of claim 12 wherein the plurality of strips are attached to the backing sheet in stub area with adhesive.

27. A group of size-adjustable hospital wristbands, comprising:
   a backing sheet connected to a bottom surface of a stub area;
   a plurality of bottom liners disposed between the backing sheet and a plurality of strips, each bottom liner being removably adhered to one of the plurality of strips;
   each strip of the plurality of strips comprising a first end and a second end, the second end attached to the stub area, each strip also comprising a bottom side partially coated with a bottom adhesive layer disposed in matching registry with one of the bottom liners, each strip further comprising a top surface;
   a plurality of top sheets each having a first end and a second end, the second end of each top sheet detachably attached to the stub area and in matching registry with one of the strips, the first end of each top sheet attached to one of the strips along the top surface thereof, each top sheet being clear and including a bottom side coated with a top adhesive layer;
   a plurality of top liners, each top liner sandwiched between one of the top adhesive layers and one of the strips;
   wherein the stub area, second ends of the strips and top sheets are perforated to permit separation of the strips and top sheets from the stub area without tearing.

28. The group of size-adjustable wristbands of claim 27 wherein the second ends of the strips overlie and extend beyond the bottom liners in the stub area to permit the backing sheet to be attached to the stub area and the second ends of the strips to be detachably attached to the stub area.

29. The group of size-adjustable wristbands of claim 27 wherein the stub area and backing sheet extend beyond the top liners to permit the backing sheet to be detachably attached to the stub area.

\* \* \* \* \*